United States Patent
Nakajima et al.

(10) Patent No.: US 7,599,387 B2
(45) Date of Patent: Oct. 6, 2009

(54) DCE TO DTE CONNECTION ADAPTER FOR COMMUNICATION DEVICE

(75) Inventors: Kazuya Nakajima, Isesaki (JP);
Masaru Tabata, Ohta (JP); Wataru Iwazaki, Yamada-gun (JP)

(73) Assignee: Sanden Corporation, Isesaki-Shi, Gunma (JP)

( * ) Notice: Subject to any disclaimer, the term of this patent is extended or adjusted under 35 U.S.C. 154(b) by 471 days.

(21) Appl. No.: 11/373,302

(22) Filed: Mar. 13, 2006

(65) Prior Publication Data

US 2006/0209804 A1   Sep. 21, 2006

(30) Foreign Application Priority Data

Mar. 15, 2005   (JP) .............................. 2005-072788

(51) Int. Cl.
*H04L 12/26* (2006.01)
(52) U.S. Cl. ...................... 370/463; 370/229
(58) Field of Classification Search ................ 370/229, 370/230, 235; 379/1.01, 9, 15.01
See application file for complete search history.

(56) References Cited

U.S. PATENT DOCUMENTS

| | | | | |
|---|---|---|---|---|
| 5,812,819 | A * | 9/1998 | Rodwin et al. ................. | 703/23 |
| 6,996,621 | B1 * | 2/2006 | Borella et al. ............... | 709/228 |
| 7,376,767 | B1 * | 5/2008 | Black et al. .................... | 710/52 |
| 2005/0227728 | A1 * | 10/2005 | Trachewsky et al. ..... | 455/552.1 |
| 2006/0085579 | A1 * | 4/2006 | Sato ............................ | 710/73 |

FOREIGN PATENT DOCUMENTS

JP        2003-051056        2/2003

* cited by examiner

*Primary Examiner*—Chi H Pham
*Assistant Examiner*—Fan Ng
(74) *Attorney, Agent, or Firm*—Banner & Witcoff, Ltd.

(57) ABSTRACT

A connection adapter converts in accordance with prescribed rules into a form suitable for a second communication device, transmits or discards data transmitted by high-level equipment for use by a first communication device, and also converts in accordance with prescribed rules into a form suitable for the high-level equipment, transmits or discards data received from the second communication device.

6 Claims, 7 Drawing Sheets

Fig. 4

CONVERT DATA
FOR SECOND RADIO PACKET COMMUNICATION NETWORK

| CALL DESTINATION | ATD9999 |
|---|---|
| FIXED IP ADDRESS OF HIGH-LEVEL EQUIPMENT | 192.168.0.1 |
| PAP AUTHENTICATION DATA | USER'S NAME :user@example.com<br>PASSWORD :password |
| IP ADDRESS OF CONNECTING DESTINATION ROUTER | 172.16.0.9 |

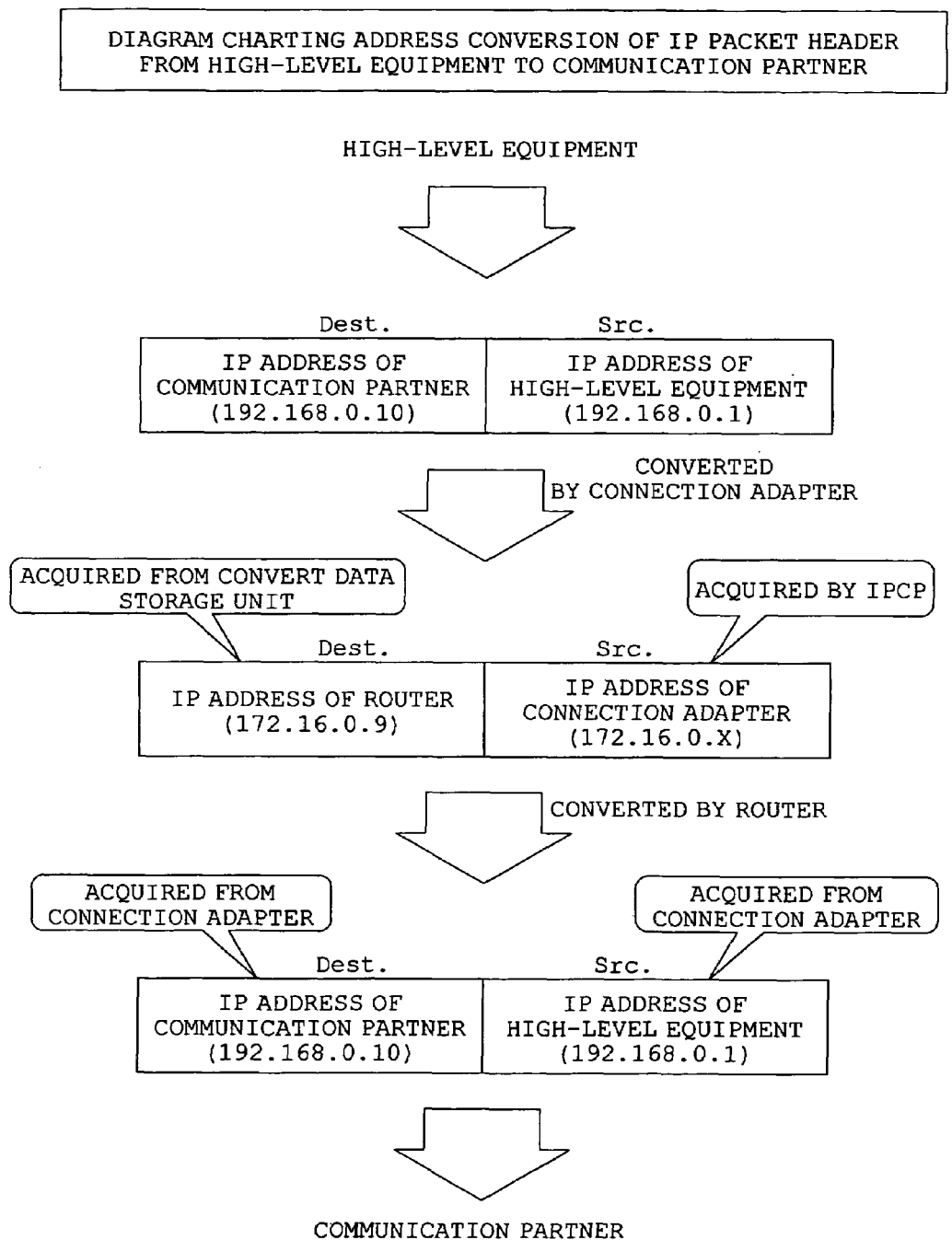

DCE TO DTE CONNECTION ADAPTER FOR COMMUNICATION DEVICE

BACKGROUND OF THE INVENTION

The present invention relates to the field of telemetering including the collection of sales information regarding vending machines and that of telematics including the distribution of traffic information to mobile objects. More particularly, it relates to a connection adapter for connection of a communication device used in these fields to high-level equipment using such communication device.

DESCRIPTION OF THE RELATED ART

Telemetering and telematics by which information is collected and distributed via a radio packet communication network have come into extensive use in recent years. Telemetering originally was a generic term referring to mechanisms of remotely reading the counts of measuring instruments over communication lines. More recently, however, the term has come to cover not only reading of data but monitoring of operation and remote control of a device in general. Typical examples of telemetering are found in sales management systems for vending machines, consumption management systems for gas, water or the like and management systems for unmanned parking lots. For an example of sales management systems for vending machines, reference may be made to Japanese Patent Publication 2003-51056. Telematics concern making available information service on a real time basis by combining a communication system with mobile objects, such as motor vehicles. Typical examples of telematics include vehicle-mounted information systems for supplying traffic information and navigation information to terminals mounted on motor vehicles on a real time basis.

The use of such technologies requires in remote locations communication devices to be connected to a radio packet communication network and high-level equipment using such communication device. The high-level equipment corresponds to data terminal equipment (DTE). The communication device corresponds to data circuit-terminating equipment (DCE). In a sales management system for vending machines, for example, a control device for performing sales control or controlling temperature inside the vending machines corresponds to high-level equipment.

As the standard, service form and other aspects of a radio packet communication network may widely differ with the carrier (communication common carrier), a communication device also widely differs with the carrier in standard and operation. Therefore, in designing high-level equipment, the carrier and the communication device to be used are selected in advance, and the high-level equipment is so designed as to operate in a way supporting the communication device.

In recent years, requests for changing the carrier are sometimes presented after constructing such a system. The reason for such a request may be, for example, "the currently used carrier cannot ensure a stable electric wave condition or is unsuitable in the location of the high-level equipment."

However, if the carrier is to be changed, the communication device will also have to be changed accordingly, and therefore the high-level equipment will also need to be modified or remodeled. Since the high-level equipment are distributed among different locations distant from one another because of the nature of this system, if high-level equipment is widely installed in the market, the workload of modifying or remodeling these devices will be enormous. This problem will occur not only when the carrier is to be changed, but may arise, even if the carrier remains the same, when the communication device is to be changed to another type. As this problem may arise when the carrier and/or the device type is to be changed in the future, the carrier and device type should be selected with extreme caution in constructing the system. There is another problem that, when a plurality of carriers or device types are to be used in constructing the system, high-level equipment should be provided for each carrier or communication device, the system construction will become costly.

BRIEF SUMMARY OF THE INVENTION

An object of the present invention is to provide a connection adapter for connecting high-level equipment and a communication device so that a plurality of types of communication devices and communication services can be used without changing or modifying high-level equipment.

In order to achieve the object stated above, the present application for patent proposes a connection adapter for connecting high-level equipment being Data Terminal Equipment, and a first communication device being Data Circuit-terminating Equipment. The first communication device here comprises Data Circuit-terminating Equipment for a first network connection service. The high-level equipment is designed to be connectable to a second communication device being Data Circuit-terminating Equipment. Further, the second communication device comprises Data Circuit-terminating Equipment for a second network connection service. The connection adapter for the communication device according to the present invention is provided with a communication control unit for converting data transmitted by the high-level equipment for use by the second communication device in accordance with prescribed rules so as to be normally processible by the first communication device and transmits the converted data to the first communication device or relay the received data to the first communication device intact or discards the received data, and for converting data received from the first communication device in accordance with prescribed rules so as to be normally processible by the high-level equipment and transmits the converted data to the high-level equipment or relay the received data to the high-level equipment intact or discards the received data.

According to the invention, the communication control unit of the connection adapter converts into a form suitable for the first communication device, transmits or discards data transmitted by the high-level equipment for use by the second communication device, and converts into a form suitable for the high-level equipment, transmits or discards data transmitted by the first communication device. By having the connection adapter according to the invention intervene, high-level equipment designed for use by the second network connection service and the second communication device is made connectable, without having to modify or remodel it, to the first communication device to receive the supply of the first network connection service. Examples of forms of network connection service include allocation of a fixed IP address to a terminal for the second network connection service and dynamic assignment of an IP address to a terminal for the first network connection service.

Incidentally, address systems and authentication processing methods in packet communication networks constructed by carriers in network connection services widely vary from carrier to carrier and from service to service.

Now in the connection adapter according to the invention, the communication control unit, while connected to a network by the first network connection service, converts an IP address for use in the second network connection service, contained in a packet received from the high-level equipment side, into an IP address for use in the first network connection service. The communication control unit also converts an IP address for use in the first network connection service, contained in a packet received from the first communication device, into an IP address for use in the second network connection service.

According to the invention, high-level equipment designed for use by the second network connection service, without having to modify or remodel it, can be connected to a packet communication network provided by the first network connection service different in network system.

The connection adapter according to the invention pertaining to the present invention is further provided with a connection control unit which, in an environment in which only when the pair of IP address and telephone number of a connection terminal is identical with a pre-allocated pair of fixed IP address and telephone number, communication from that connection terminal is permitted in the second network connection service, processes authentication of connection to the first network connection service, when a request for connection to a network pertaining to the second network connection service is received from high-level equipment, by using the first communication device to establish connection with a network pertaining to the first network connection service.

According to the invention, high-level equipment designed for use by the second network connection service, without having to modify or remodel it, can be connected to a packet communication network provided by the first network connection service different in the system of authenticating connection.

Other objects, configurations and advantages of the present invention will become apparent from the following detailed description.

BRIEF DESCRIPTION OF THE SEVERAL VIEWS OF THE DRAWINGS

FIG. 4 shows an example of data stored in a converted data storage unit;

FIG. 7 illustrates address conversion processing.

DETAILED DESCRIPTION OF THE INVENTION

Figure 1:
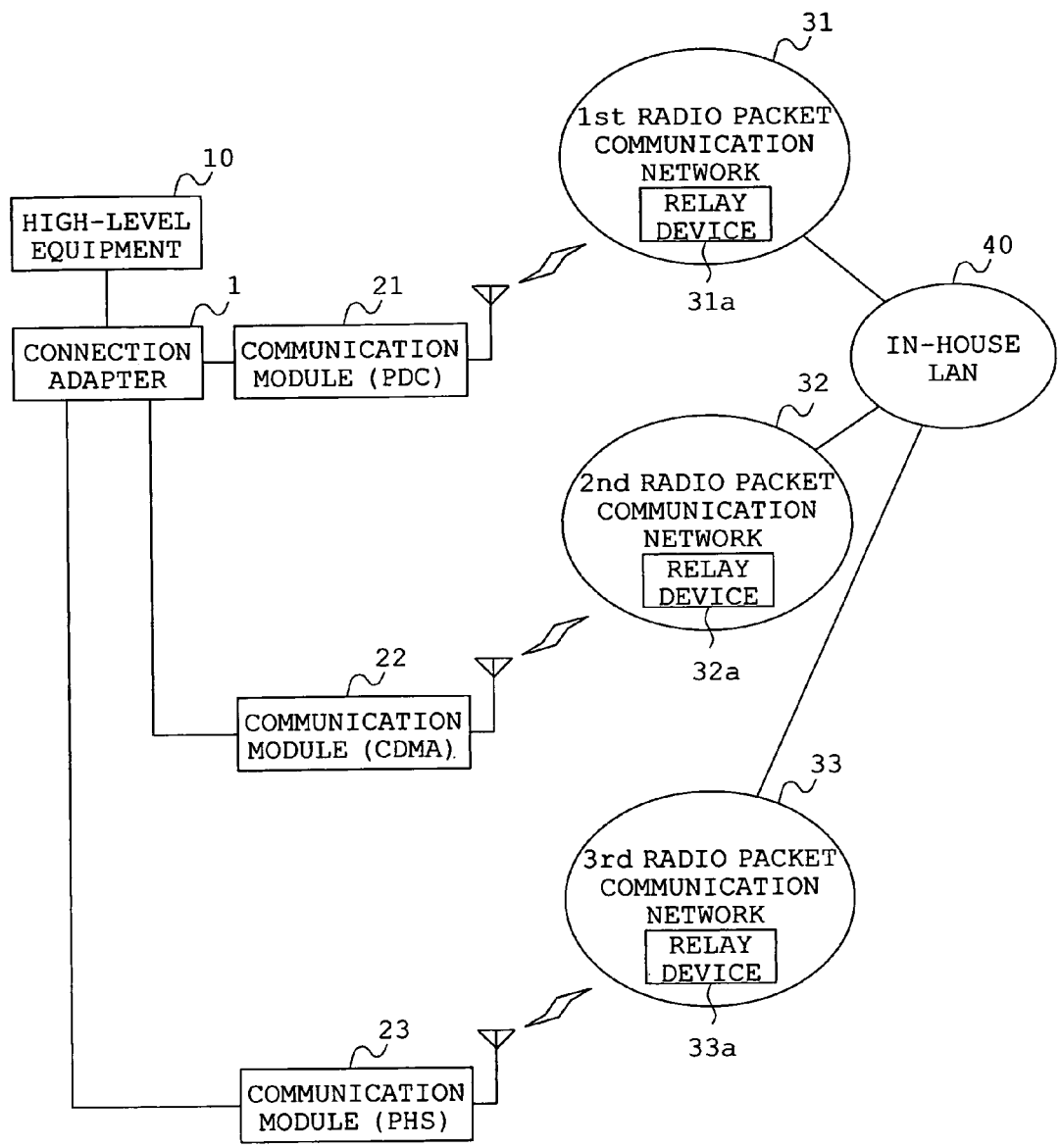
FIG. 1 is a network configuration diagram of a system using a connection adapter for a communication device.

A connection adapter for a communication device according to an embodiment of the present invention, will be described with reference to the accompanying drawings. FIG. 1 is a network configuration diagram of a system using the connection adapter for the communication device according to the present embodiment.

This connection adapter 1 is intended for connecting a plurality of types of high-level equipment 10 and a plurality of types of communication devices 21, 22 and 23. The connection adapter 1 of this embodiment supports a communication module 21 of the PDC (Personal Digital Cellular) standard, a communication module 22 of the CDMA (Code Division Multiple Access) standard and a communication module 23 of the PHS (Personal Handy-phone System) standard. Each of the communication modules 21, 22 and 23 corresponds to data circuit-terminating equipment (DCE). Each of the communication modules 21, 22 and 23 is a communication device connected to radio packet communication networks 31, 32 and 33 which constructed respective corresponding carriers, and support the communication standards, the communication protocols and the services determined by the respective carriers on their own. The high-level equipment 10 corresponds to data terminal equipment (DTE). Each high-level equipment 10 is so designed as to support a specific carrier and the service provided by that carrier. More specifically, it is so designed as to connect a communication module supporting the service and to be compatible with the connection protocol, authentication protocol and so forth supporting the service.

In this embodiment, each of the radio packet communication networks 31, 32 and 33 is supposed to make available the following services, which will be described below.

In the network connection services in the first and third radio packet communication networks 31 and 33, the carrier allocates telephone numbers to the communication modules 21 and 22 in advance. In each of the radio packet communication networks 31 and 33, relay devices 31a and 33a for performing connection control, packet relaying and the like are provided. To the relay devices 31a and 33a, telephone numbers are allocated, supporting an in-house LAN 40 which is the network to be connected to. When any of the telephone numbers of each of the relay devices 31a and 33a in the radio packet communication network 31 and 33 is called, a terminal connected to the communication modules 21 and 23 is connected to a prescribed network such as the in-house LAN 40. Connection to the relay devices 31a and 33a is permitted only from the communication modules 21 and 23 to which telephone numbers are allocated in advance. An IP address group in a prescribed range is allocated from the carrier, and a fixed IP address included in the IP address group is allocated to each of the terminals connected to the communication module 21 and 23. The relay devices 31a and 33a relay only the packets transmitted or received within the IP address group.

In the network connection service in the second radio packet communication network 32, a telephone number is allocated to the communication module 22 in advance by the carrier. The second radio packet communication network 32 is provided with a relay device 32a for performing connection control, packet relaying and the like. A terminal connected to the communication module 22 is connected to the second radio packet communication network 32 by designating and calling a special predetermined number. Then, the terminal is made connectable to the in-house LAN 40, which is the network to be connected to, by processing authentication using the Password Authentication Protocol (PAP), which is a type of authentication protocol, with the relay device 32a. In this PAP authentication, the network to be connected to is specified by having information to specify that network contained in the user name. As the IP address group in the prescribed range is allocated by the carrier, an IP address included in the IP address group is dynamically allocated to each of the terminals connected to the communication module 22 by the Internet Protocol Control protocol (IPCP).

The high-level equipment 10 in this embodiment of the invention is supposed to be directly connectable to the communication module 21 of the PDC standard and the communication module 23 of the PHS standard. They are further supposed to be made connectable to the in-house LAN 40 via each of the radio packet communication networks 31 and 33 by using the communication modules 21 and 23. The connection adapter 1 of this embodiment makes the high-level equipment 10 connectable to the in-house LAN 40 via the second radio packet communication network 32, without having to modify or remodel them, by using the communication module 22 of the CDMA standard. This connection adapter 1 will be described in detail below.

Figure 2:
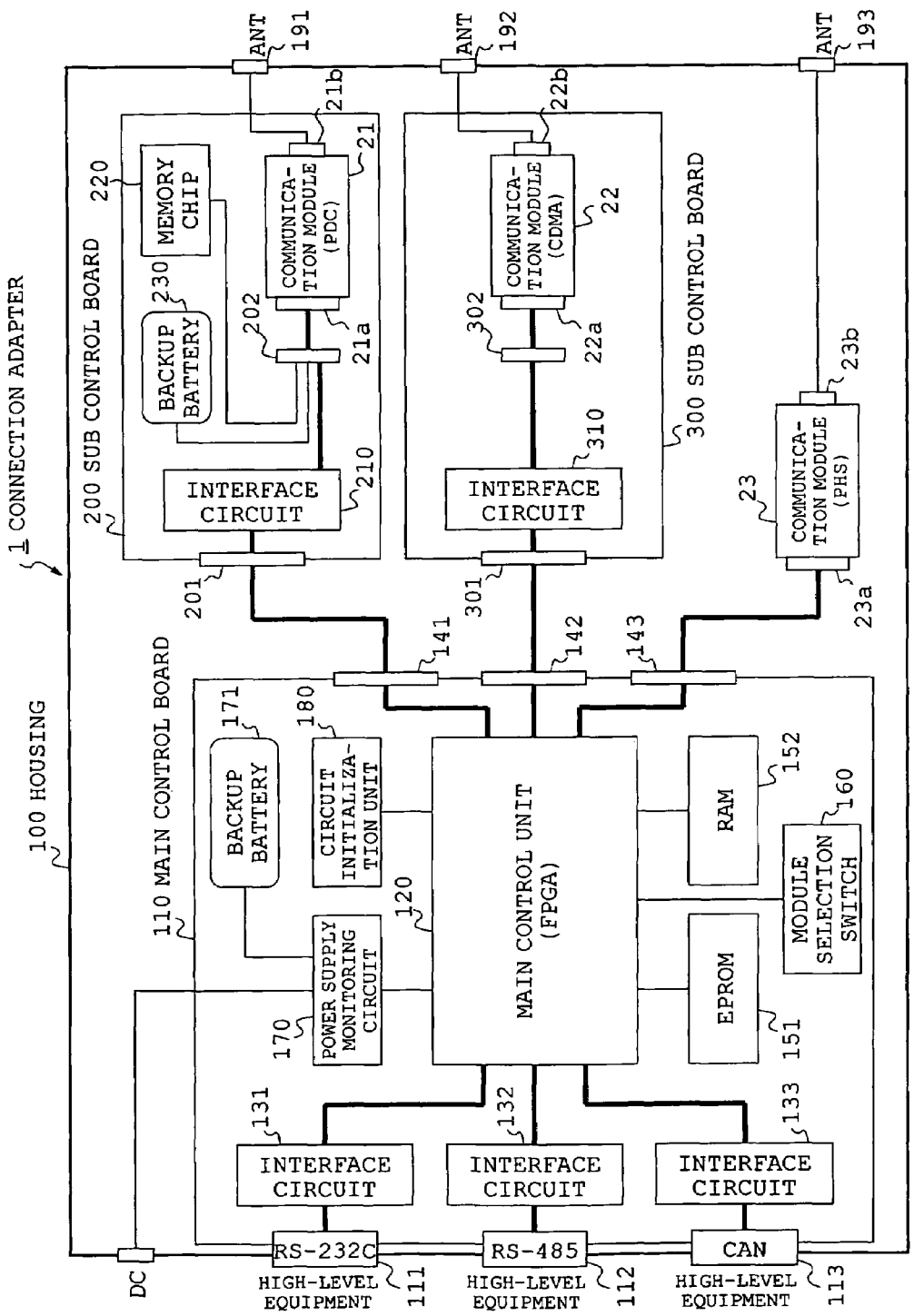
FIG. 2 is a configuration diagram of the connection adapter.

First, the configuration of the connection adapter 1 of this embodiment will be described with reference to FIG. 2. FIG. 2 shows a state in which the three communication modules 21, 22 and 23 are built into the connection adapter 1.

The connection adapter 1 is provided, in a housing 100, with a main control board 110, a sub-control board 200 for mounting the communication module 21 of the PDC standard, another sub-control board 300 for mounting the communication module 22 of the CDMA standard and the communication module 23 of the PHS standard. The sub-control boards 200 and 300 and the communication module 23 are detachable from the main control board 110.

The connection adapter 1 of this embodiment is provided with a plurality of types of connectors for connection to high-level equipment to make it connectable to a plurality of types of main control units. More specifically, the main control board 110 is provided with a connector 111 for use in accordance with the RS-232C standard, a connector 112 for use in accordance with the RS-485 standard and a connector 113 for use in accordance with the Controller Area Network (CAN) standard.

The main control board 110 is provided with a main control unit 120 implemented with a field programmable gate array (FPGA) which is a kind of programmable logic device (PLD), an interface circuit 131 of the RS-232C standard, an interface circuit 132 of the RS-485 standard and an interface circuit 133 of the CAN standard. Each of the interface circuits 131, 132 and 133 intervenes between the respectively corresponding connectors 111, 112 and 113 and the main control unit 120. This arrangement enables the main control unit 120 to communicate with high-level equipment connected to the connectors 111, 112 and 113 via the respective interface circuits 131, 132 and 133.

Also, the main control board 110 is provided with a connector 141 for connection to the sub-control board 200, a connector 142 for connection to the sub-control board 300 and a connector 143 for connection to the communication module 23 of the PHS standard. Each of the connectors 141, 142 and 143 is connected to the main control unit 120. This arrangement enables the main control unit 120 to communicate with the communication module 21 of the PDC standard via the sub-control board 200. Similarly, the main control unit 120 can communicate with the communication module 22 of the CDMA standard via the sub-control board 300. Further, the main control unit 120 can directly communicate with the communication module 23 of the PHS standard.

Further, an EPROM 151 storing control programs for the main control unit 120 and a RAM 152 to be used as an area for various works to be done by the main control unit 120 are provided on the main control board 110. The main control board 110 is also equipped with a module selection switch 160 for selection of the one to be used among the communication modules 21, 22 and 23. The main control unit 120 operates so as to correspond to the module selected by the module selection switch 160 out of the communication modules 21, 22 and 23. The configuration and operations of the main control unit 120 will be described afterwards.

This main control board 110 operates on DC power supplied from outside. The main control board 110 supplies DC power to the sub-control board 200 via the connector 141. The main control board 110 also supplies DC power to the sub-control board 300 via the connector 142. Further, the main control board 110 supplies DC power to the communication module 23 of the PHS standard via the connector 143. Also, the main control unit 120 is provided with a power supply monitoring circuit 170 for keeping watch any abnormality in DC power supply from outside and a backup battery 171. The power supply monitoring circuit 170, upon detecting any abnormality in power supply from outside, so effects control as to have power supplied from the backup battery 171 to the main control board 110, the sub-control boards 200 and 300 and the communication module 23 of the PHS standard. Also, the power supply monitoring circuit 170, upon detecting any abnormality in power supply from outside, notifies the main control unit 120 of that abnormality. Further, the power supply monitoring circuit 170, upon detecting recovery of power supply from outside after any abnormality in power supply, notifies the main control unit 120 of the recovery.

The main control board 110 is also provided with a circuit initialization unit 180 for initializing and generating internal circuits of the main control unit 120 implemented with an FPGA. The circuit initialization unit 180 has built-in programs for initializing and generating internal circuits of the main control unit 120. If the absence of circuit generation in the FPGA is detected when power supply is turned on, or a pertinent instruction is received from an externally connected terminal (not shown), a circuit to constitute the main control unit 120 is formed within the FPGA.

The sub-control board 200 is intended for connecting the main control board 110 and the communication module 21 of the PDC standard. The sub-control board 200 is provided with a connector 201 for connection to the main control board 110, a connector 202 for connection to a terminal 21a of the communication module 21 of the PDC standard, and an interface circuit 210 for connecting the main control board 110 and the communication module 21. The interface circuit 210 performs alteration of the number of pins, conversion of pin assignment and waveform shaping between the connector 202 and the connector 201. The communication module 21 here in this embodiment is supposed to require a prescribed memory chip storing its own telephone number and like information and a dedicated backup battery. To meet these requirements, the sub-control board 200 is so configured as to allow connection of the memory chip 220 and a backup battery 230 to the communication module 21 via the connector 202. The sub-control board 200, as described above, operates on DC power supplied from the main control board 110, and supplies DC power to the communication module 21 via the connector 202. Incidentally, an antenna connection terminal 21b of the communication module 21 is connected to an antenna connection terminal 191 attached to the housing 100.

The sub-control board 300 is intended for connecting the main control board 110 and the communication module 22 of the CDMA standard. The sub-control board 300 is provided with a connector 301 for connection to the main control board 110, a connector 302 for connection to a terminal 22a of the communication module 22 of the CDMA standard, and an interface circuit 310 for connecting the main control board 110 and the communication module 22. The interface circuit 310 performs alteration of the number of pins, conversion of pin assignment and waveform shaping between the connector 302 and the connector 301. The sub-control board 300, as described above, operates on DC power supplied from the main control board 110, and supplies DC power to the communication module 22 via the connector 302. Incidentally, an antenna connection terminal 22*b* of the communication module 22 is connected to an antenna connection terminal 192 attached to the housing 100.

A terminal 23*a* of the communication module 23 of the PHS standard is connected to the connector 143 of the main control board 110. An antenna connection terminal 23*b* of the communication module 23 is connected to an antenna connection terminal 193 attached to the housing 100.

Figure 3:
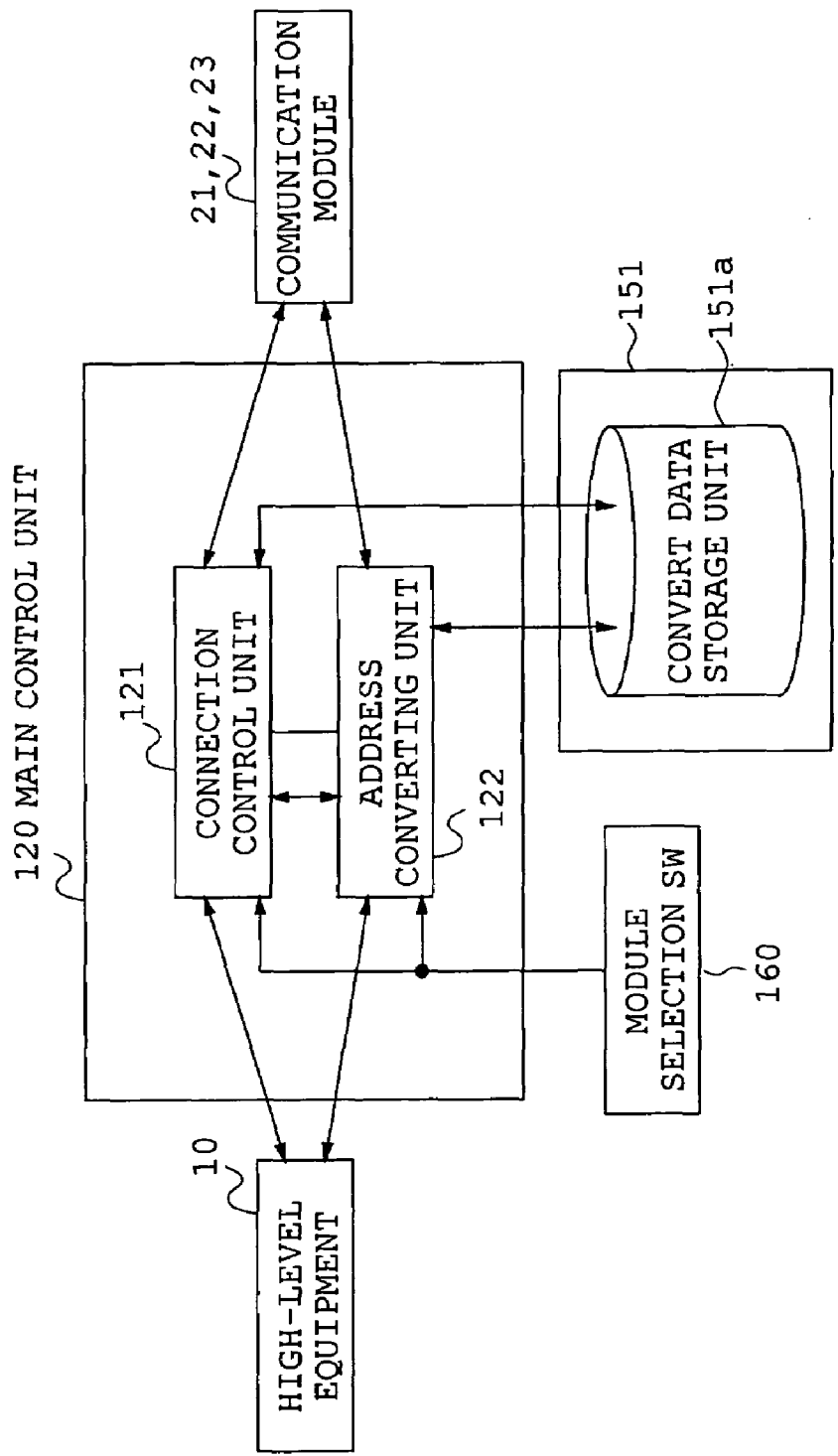
FIG. 3 is a functional block diagram of a main control unit.

Next, the configuration and operations of the main control unit 120 will be described with reference to FIG. 3. FIG. 3 is a functional block diagram of the main control unit 120. The following description concerns only the essentials of the present invention, and other aspects of the configuration are not discussed.

As shown in FIG. 3, the main control unit 120 is provided with a connection control unit 121 which performs connection control including the establishment of line connection and an address converting unit 122 which performs address conversion in data communication on the line established by the connection control unit 121. The connection control unit 121 performs line connection control in accordance with AT commands and control of IP layer connection in accordance with the Link Control Protocol (LCP) and IPCP. The address converting unit 122 converts IP addresses contained in the headers of the IP layer.

The connection control unit 121 and the address converting unit 122 switch over processing correspondingly to the communication module 21, 22 or 23 selected by the module selection switch 160. The high-level equipment 10 in this embodiment is so designed as to be usable by directly connecting the communication module 21 or 23. For this reason, the connection control unit 121 and the address converting unit 122, when the communication module 21 or 23 is selected by the module selection switch 160, transmit data between the high-level equipment 10 and the communication module 21 or 23 without subjecting them to any particular processing. On the other hand, when the communication module 22 is selected, the connection control unit 121 and the address converting unit 122 subjects data between the high-level equipment 10 and the communication module 22 to processing such as conversion, transmission, discarding or else in accordance with prescribed rules. The data required for these ways of processing are stored in a converted data storage unit 151*a* of the EEPROM 151.

Data stored in the converted data storage unit 151*a* will be described with reference to FIG. 4. As shown in FIG. 4, call initiation commands (including the telephone number) for connection to the second radio packet communication network 32, the fixed IP addresses of high-level equipment 10, authentication data needed for connection to the second radio packet communication network 32, and the IP address of a connecting destination router 43 are stored in the converted data storage unit 151*a*. The connecting destination router 43 here is a relay device corresponding to the point of connection between the second radio packet communication network 32 and the in-house LAN 40, and has a connection control function and an address converting function supporting this connection adapter 1 (see FIG. 6).

Next, the operations of the connection adapter 1 of this embodiment will be described with reference to drawings. To begin with, a case in which high-level equipment 10 is to be connected to the in-house LAN 40 via the first radio packet communication network 31 will be described with reference to the sequence chart of FIG. 5. As described above, since the high-level equipment 10 is compatible with the communication module 21 of the PDC standard and the first radio packet communication network 31, the connection adapter 1 simply applies no processing to data between the high-level equipment 10 and the communication module 21. Incidentally, a similar operation takes place when the high-level equipment 10 is connected to the in-house LAN 40 via the third radio packet communication network 33.

The following is presupposed here. A telephone number "080AABB" is allocated to the communication module 21 by the carrier. IP addresses of 192.168.0.0/28 are distributed by the carrier, and an IP address 192.168.0.1 is allocated to the high-level equipment 10 which is to be connected to the first radio packet communication network 31 by using the communication module 21. The communication partner 41 of the high-level equipment 10 is in the in-house LAN 40, whose IP address is 192.168.0.10. The communication module 21 is connected to a relay device in the first radio packet communication network 31 by initiating a call to "080XXYY" by an "ATDT" command.

Figure 5:
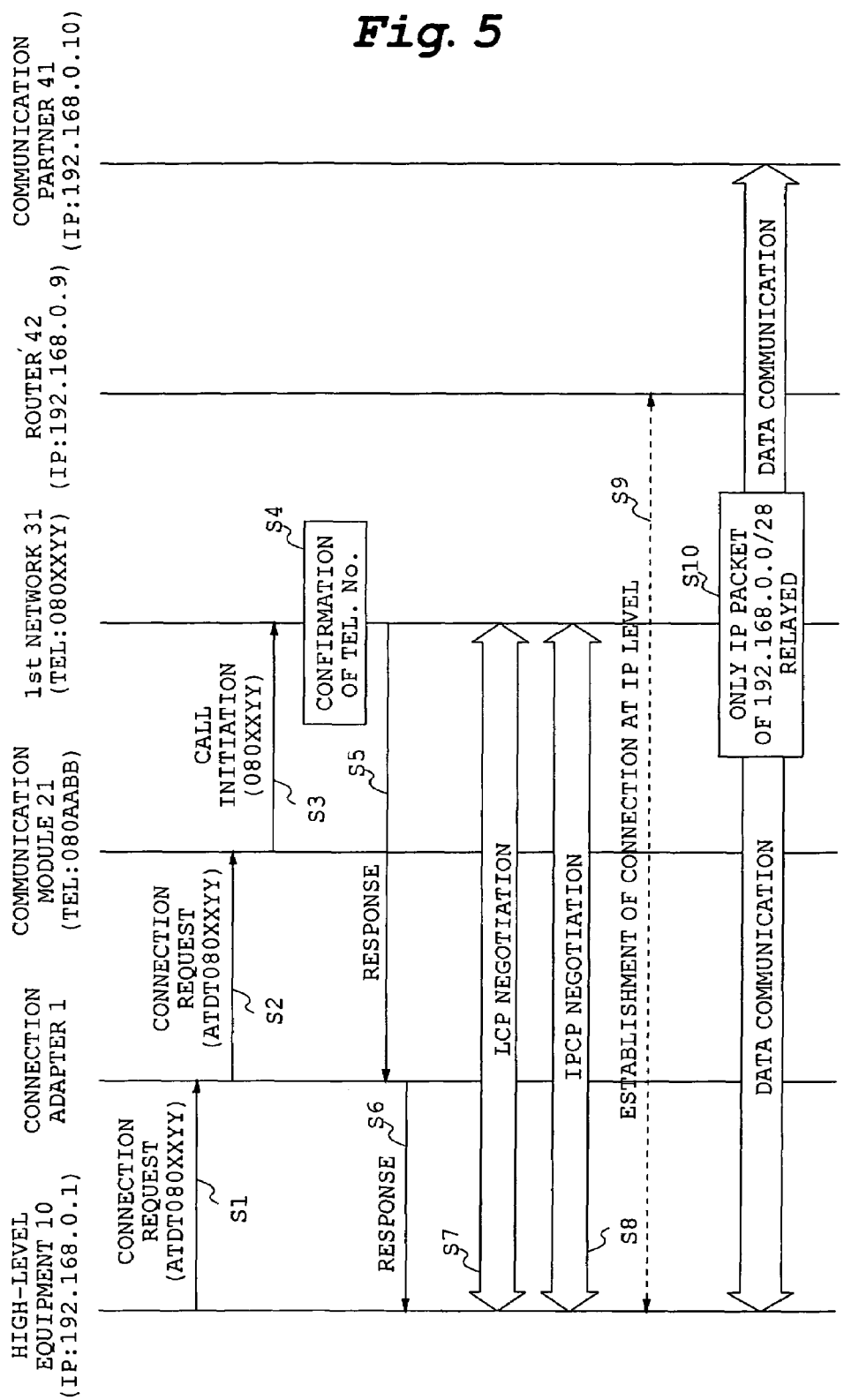
FIG. 5 illustrates the call initiating sequence on the high-level equipment side where a first radio packet communication network is used.

As shown in FIG. 5, when the high-level equipment 10 initiates a call of an "ATDT080XXYY" command to the connection adapter 1 (step S1), the connection control unit 121 of the connection adapter 1 transfers the command as it is to the communication module 21 (step S2). Possible triggers to this call initiation include the occurrence of an IP packet having a destination address of 192.168.0.10. In accordance with the AT command, the communication module 21 initiates a call to a relay device in the first radio packet communication network 31 (step S3). Then, the relay device checks the telephone number of the call-initiating communication module 21 and, if the call is from a non-contracting terminal, refuses its connection (step S4). The connection control unit 121 of the connection adapter 1, when receiving a response "CONNECT" indicating the completion of connection at the line level via the communication module 21 (step S5), transfers the response to the high-level equipment 110 (step S6).

Next, the high-level equipment 10 starts processing by PPP to accomplish connection to the in-house LAN 40 via the first radio packet communication network 31. More specifically, it establishes connection at the IP level to the first radio packet communication network 31 by LCP and IPCP (steps S7 and S8). The connection control unit 121 of the connection adapter 1 then transmits packets pertaining to LCP and IPCP mutually. As described so far, since the high-level equipment 10 and the in-house LAN 40 are enabled to communicate between each other at the IP level (step S9), data communication using superior protocols including TCP/UDP is thereafter made possible between them. Incidentally, the relay device of the first radio packet communication network 31 relays only the IP packets whose destination and source IP addresses are included in 192.168.0.0/28 (step S10).

Figure 6:
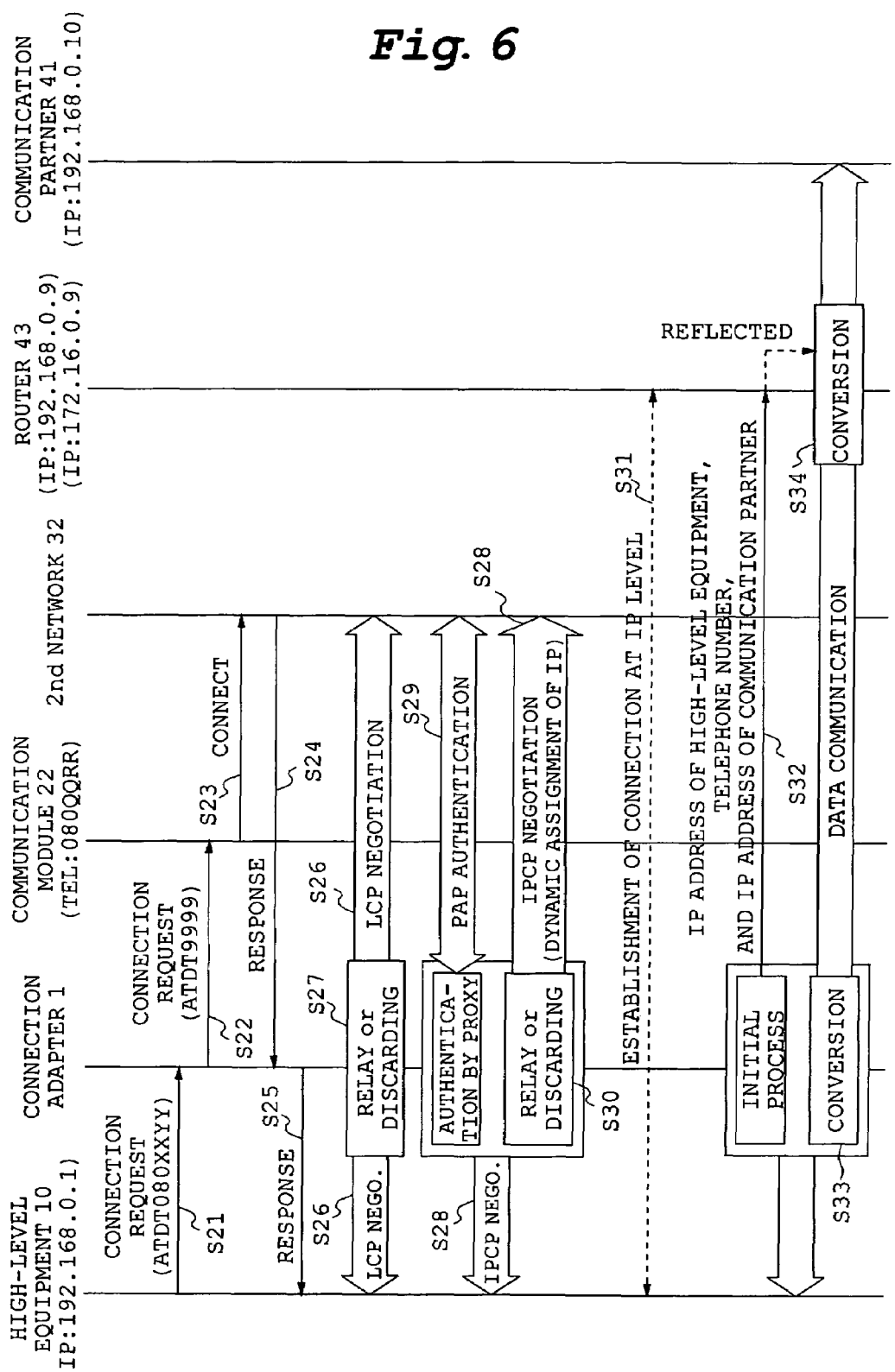
FIG. 6 illustrates the call initiating sequence on the high-level equipment side where a second radio packet communication network is used.

Next, a case in which connection to the in-house LAN 40 is established by using the communication module 22 of the CDMA standard and the second radio packet communication network 32 without modifying or remodeling this high-level equipment in any way will be described with reference to FIG. 6 and FIG. 7. FIG. 6 is a sequence chart of a case in which the second radio packet communication network is used, and FIG. 7, a diagram illustrating the conversion process of IP address stated in the header of the IP packet transmitted from the high-level equipment 10.

The following is presupposed here. A telephone number "080QQRR" is allocated to the communication module 22 by the carrier. IP addresses of 172.16.0.0/28 are distributed by the carrier, and one of IP addresses of 172.16.0.0/28 is dynamically allocated to the high-level equipment 10 which is to be connected to the first radio packet communication network 32 by using the communication module 22. An address of 172.26.0.9 is allocated to the connecting destination router 43, which corresponds to the point of connection between the second radio packet communication network 32 and the in-house LAN 40. The communication partner 41 of the high-level equipment 10 is in the in-house LAN 40, whose IP address is 192.168.0.10. The communication module 22 is connected to a relay device in the second radio packet communication network 32 by initiating a call with an "ATD9999" command. The relay device undergoes user authentication by PAP, and the destination of connection (the in-house LAN 40 in this case) is specified.

As shown in FIG. 6, when the high-level equipment 10 initiates an "ATDT080XXYY" command to the connection adapter 1 (step S21), the connection control unit 121 of the connection adapter 1 converts the command into "ATD9999" and transfers it to the communication module 22 (step S22). Possible triggers to this call initiation include the occurrence of an IP packet having a destination address of 192.168.0.10 as shown in FIG. 7. In accordance with the AT command, the communication module 22 initiates a call to a relay device in the second radio packet communication network 32 (step S23). The connection control unit 121 of the connection adapter 1, when receiving a response "CONNECT" indicating the completion of connection at the line level via the communication module 22 (step S24), transfers the response to the high-level equipment 10 (step S25).

Next, the high-level equipment 10 begins processing for connection to the in-house LAN 40 via the second radio packet communication network 32 by PPP. More specifically, first it starts an LCP negotiation with a relay device of the second radio packet communication network 32 (step S26). Here, the connection control unit 121 of the connection adapter 1 transmits only those of LCP packets between the high-level equipment 10 and the relay device that can be processed by both devices and are necessary for the LCP negotiation, and discards other LCP packets (step S27). This completes the LCP negotiation.

Then, the high-level equipment 10 starts an IPCP negotiation with the relay device of the second radio packet communication network 32 (step S28). The connection control unit 121 of the connection adapter 1, when receiving the first packet of the IPCP negotiation from the high-level equipment 10, performs PAP processing between the connection adapter 1 and the relay device of the second radio packet communication network 32 (step S29). This PAP authentication processing, though not supposed to be performed for high-level equipment 10 produced for the first radio packet communication network 31, is required when the second radio packet communication network 32 is to be used. In this embodiment, therefore, the connection adapter 1 processes authentication on behalf of the high-level equipment 10. Upon completion of this authentication processing, the connection control unit 121 of the connection adapter 1 transmits only those of LCP packets between the high-level equipment 10 and the relay device that can be processed by both devices and are necessary for the IPCP negotiation, and discards other IPCP packets (step S30). This completes the IPCP negotiation, and a dynamic IP address: 172.16.0.X is assigned to the connection control unit 121 of the connection adapter 1 from the second radio packet communication network 32. The assigned dynamic IP address is stored in some means of storage such as the EPROM 151.

In this way, the connection adapter 1 and the in-house LAN 40 are enabled to communicate with each other at the IP level (step S31). However, while the high-level equipment 10 and the in-house LAN 40 use the address system of 192.16.0.0/28 allocated by the carrier of the first radio packet communication network 31, the second radio packet communication network 32 uses the address system of 172.16.0.0/28. As a result, the address converting unit 122 of the connection adapter 1 and the connecting destination router 43 convert the destination IP address and the source IP address stated in the header of the IP packet.

Here in the conversion processing in the address converting unit 122 of the connection adapter 1, the information stored in the converted data storage unit 151a and the dynamic IP address assigned by IPCP are used. On the other hand, in the conversion processing in the connecting destination router 43, necessary information for address conversion including the dynamic IP address assigned by IPCP to the connection adapter 1 should be acquired. To meet this need, the connection control unit 121 of the connection adapter 1, when an IP packet is to be first transmitted from the high-level equipment 10 to the in-house LAN 40, in advance of the transmission of the packet notifies the connecting destination router 43 of the telephone number of the communication module 22, the fixed IP address of the high-level equipment 10, the IP address of the communication partner 41 of the high-level equipment 10 (the destination IP address of the header of the IP packet transmitted by the high-level equipment 10) (step S32).

Thereafter, the address converting unit 122 of the connection adapter 1 converts the IP address: 192.168.0.9 of the communication partner 41 into the IP address: 172.16.0.9 of the connecting destination router 43 and the IP address: 192.168.0.1 of the high-level equipment 10 into the dynamic IP address: 172.16.0.X (step S33). On the other hand, the connecting destination router 43 performs conversions reverse to these (step S34). For the flow of this conversion processing, reference may be made to FIG. 7. The processing so far described enables data communication using superior protocols including TCP/UDP is made possible between the high-level equipment 10 and the communication partner 41 in the in-house LAN 40.

As described above, since the connection adapter 1 in this embodiment so subjects to conversion, discarding or transmission the data flowing between the high-level equipment 10 and communication modules 21, 22 and 23 as to be normally processed by the respectively pertinent devices, differences, such as in protocol, service and communication module 21, 22 or 23, among the radio packet communication networks 31, 32 and 33 can be absorbed. In this way, high-level equipment 10 designed for the first and third radio packet communication networks 31 and 33 can be connected to the second radio packet communication network 32 without having to modify or remodel them.

Although one embodiment of the present invention has been described in detail, the invention is not limited to this. For instance, while communication modules of the PDC standard, CDMA standard and PHS standard were referred to in the foregoing description of the embodiment, modules of some other standards would also allow implementation of the invention. Similarly, interfaces of some other standards can also be used on the high-level equipment side than those described above.

Also, though differences in authentication method, address system and method of address assignment (assignment of a fixed IP address or of a dynamic IP address) are discussed as examples of difference between the network connection services in the first and third radio packet communication networks 31 and 33 and those in the second radio packet communication network 32 in the above-described embodiment, the invention can be applied where they differ in only one of these points or in a combination of some of them. In addition, the connection adapter may be able to absorb some other differences as required. For instance, though the second radio packet communication network 32 uses PAP authentication in the above-described embodiment, where connection to a communication network using authentication by the Challenge Handshake Authentication Protocol (CHAP) is to be achieved, the connection adapter can be implemented with CHAP.

Further, while three communication modules 21, 22 and 23 are built into the connection adapter 1 in the above-described embodiment to make available any of the radio packet communication networks 31, 32 and 33 as desired, it is also conceivable to build only one, which would be actually used in operation, of the communication modules 21, 22 and 23 into the connection adapter 1 and connect it.

What is claimed is:

1. A connection adapter for connecting high-level equipment and a first communication device, wherein:
   said high-level equipment comprises Data Terminal Equipment; said first communication
   device comprises Data Circuit-terminating Equipment for a first network connection service;
   said high-level equipment is designed to be connectable to a second communication device;
   said second communication device comprises Data Circuit-terminating Equipment for a second network connection service; and said connection adapter comprises a communication control unit configured to:
   convert, in accordance with prescribed rules, first data received from the high-level equipment and for use by the second communication device, the first data converted so as to be normally processible by the first communication device;
   transmit the converted first data to the first communication device or relay the received first data to the first communication device intact or discard the received first data;
   convert, in accordance with other prescribed rules, second data received from the first communication device, the second data converted so as to be normally processible by the high-level equipment; and
   transmit the converted second data to the high-level equipment or relay the received second data to the high-level equipment intact or discard the received second data.

2. The connection adapter according to claim 1, wherein:
   a fixed IP address is allocated to a second communication device terminal in said second network connection service; and
   an IP address is dynamically assigned to a first communication device terminal in said first network connection service.

3. The connection adapter according to claim 1, wherein said communication control unit, while connected to a network by the first network connection service, is configured to:
   convert an IP address, for use in the second network connection service and contained in a packet received from the high-level equipment, into an IP address for use in the first network connection service; and
   convert an IP address, for use in the first network connection service and contained in a packet received from the first communication device, into an IP address for use in the second network connection service.

4. The connection adapter according to claim 1, wherein:
   said second network connection service permits a terminal having a pre-allocated fixed IP address and a pre-allocated fixed telephone number to communicate in said second network connection service; and
   said connection control unit is further configured to perform a process for authentication of, and establishment of, a connection to the first network connection service by using the first communication device, when a request for connection pertaining to the second network connection service is received from the high-level equipment.

5. The connection adapter according to claim 4, wherein the authentication of a connection to said first network connection service is processed in accordance with a Password Authentication Protocol (PAP).

6. The connection adapter according to claim 4, wherein the authentication of a connection to said first network connection service is processed in accordance with a Challenge Handshake Authentication Protocol (CHAP).

* * * * *

UNITED STATES PATENT AND TRADEMARK OFFICE
CERTIFICATE OF CORRECTION

PATENT NO.        : 7,599,387 B2
APPLICATION NO. : 11/373302
DATED             : October 6, 2009
INVENTOR(S)       : Nakajima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this

Twenty-eighth Day of September, 2010

David J. Kappos
*Director of the United States Patent and Trademark Office*